United States Patent
Maniwa et al.

(10) Patent No.: US 8,359,529 B2
(45) Date of Patent: Jan. 22, 2013

(54) INFORMATION PROCESSING APPARATUS AND INFORMATION PROCESSING METHOD

(75) Inventors: Yukio Maniwa, Musashino (JP);
Hiroyoshi Sekino, Musashino (JP);
Atsushi Terayama, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 1472 days.

(21) Appl. No.: 11/883,454

(22) PCT Filed: Jan. 27, 2006

(86) PCT No.: PCT/JP2006/301303
§ 371 (c)(1),
(2), (4) Date: Jul. 30, 2007

(87) PCT Pub. No.: WO2006/080431
PCT Pub. Date: Aug. 3, 2006

(65) Prior Publication Data
US 2008/0215759 A1    Sep. 4, 2008

(30) Foreign Application Priority Data

Jan. 28, 2005    (JP) ................................ 2005-021423

(51) Int. Cl.
*G06F 11/16* (2006.01)
(52) U.S. Cl. ...................................................... 714/819
(58) Field of Classification Search .................. 714/819, 714/818
See application file for complete search history.

(56) References Cited

U.S. PATENT DOCUMENTS

| | | | |
|---|---|---|---|
| 3,864,670 A | 2/1975 | Inoue et al. | |
| 4,233,682 A * | 11/1980 | Liebergot et al. | 714/820 |
| 4,843,608 A * | 6/1989 | Fu et al. | 714/820 |
| 5,204,952 A * | 4/1993 | Ayers et al. | 714/48 |
| 5,640,508 A * | 6/1997 | Fujiwara et al. | 714/30 |
| 5,784,383 A | 7/1998 | Meaney | |
| 5,799,022 A * | 8/1998 | Williams | 714/797 |
| 5,845,060 A * | 12/1998 | Vrba et al. | 714/12 |
| 6,038,685 A * | 3/2000 | Bissett et al. | 714/12 |
| 6,061,599 A * | 5/2000 | Rhodehamel et al. | 700/2 |
| 6,101,627 A * | 8/2000 | Shimomura et al. | 714/820 |
| 6,173,414 B1 * | 1/2001 | Zumkehr et al. | 714/6.24 |
| 6,357,024 B1 * | 3/2002 | Dutton et al. | 714/45 |
| 6,480,970 B1 * | 11/2002 | DeKoning et al. | 714/6.12 |
| 6,519,710 B1 * | 2/2003 | Saunders et al. | 713/500 |
| 6,615,366 B1 * | 9/2003 | Grochowski et al. | 714/10 |

(Continued)

FOREIGN PATENT DOCUMENTS

EP    1283468 A2    2/2003

(Continued)

OTHER PUBLICATIONS

Supplementary European Search Report dated Feb. 7, 2011, issued in corresponding European Patent Application No. 06712469.3.

(Continued)

*Primary Examiner* — Stephen M Baker
(74) *Attorney, Agent, or Firm* — Westerman, Hattori, Daniels & Adrian, LLP

(57) ABSTRACT

A sending part sends a data generated by a second device from the second device to a first device. A data collating part collates the data sent from the sending part with a data generated by the first device, and determines that it is abnormal when a mismatch between these data occurs. Thus, a data generated by the first device is collated with a data generated by the second device and when a mismatch between these data occurs, it is determined that it is abnormal, so that abnormality can be detected surely.

6 Claims, 10 Drawing Sheets

U.S. PATENT DOCUMENTS

| | | | |
|---|---|---|---|
| 6,694,449 B2 * | 2/2004 | Ghameshlu et al. | 714/11 |
| 6,751,749 B2 * | 6/2004 | Hofstee et al. | 714/11 |
| 6,772,368 B2 * | 8/2004 | Dhong et al. | 714/11 |
| 6,880,119 B1 * | 4/2005 | Bohlin | 714/732 |
| 6,954,886 B2 * | 10/2005 | Tu et al. | 714/726 |
| 7,043,728 B1 * | 5/2006 | Galpin | 718/102 |
| 7,055,060 B2 * | 5/2006 | Nguyen et al. | 714/11 |
| 7,328,371 B1 * | 2/2008 | Kalyanasundharam et al. | 714/11 |
| 2002/0073357 A1 | 6/2002 | Dhong et al. | |
| 2004/0123201 A1 | 6/2004 | Nguyen et al. | |

FOREIGN PATENT DOCUMENTS

| | | |
|---|---|---|
| GB | 2313678 A | 12/1997 |
| JP | 2-228740 | 9/1990 |
| JP | 7-129427 | 5/1995 |
| JP | 7-281915 | 10/1995 |
| JP | 9-319401 | 12/1997 |
| JP | 2000-347706 | 12/2000 |

OTHER PUBLICATIONS

International Search Report mailed May 2, 2006.

International Preliminary Report (English translation) dated May 31, 2007 including PCT/IB/308, PCT/IB/326, PCT/IB/373, PCT/ISA/237 and PCT/IB/338.

European Office Action dated Mar. 27, 2012, issued in corresponding European Patent Application No. 06712469.3.

* cited by examiner

INFORMATION PROCESSING APPARATUS AND INFORMATION PROCESSING METHOD

FIELD OF THE INVENTION

The present invention relates to an information processing apparatus comprising plural devices for executing processing mutually independently and an information processing method, and particularly to an information processing apparatus having high reliability and an information processing method.

BACKGROUND ART

A plant control system for managing and controlling field devices arranged in a plant has been known. Also, a safety system for ensuring safety of the plant is introduced in such a plant. The safety system is a system for taking necessary measures while providing notification of an alarm when abnormality is observed in the field device, and is disposed as a part of the plant control system or independently of the plant control system.

JP-A-2000-347706 is seen as a related art.

DISCLOSURE OF THE INVENTION

Problems to be Resolved by the Invention

The safety system requires extremely high reliability from its intended function. For example, a situation in which notification of wrong information is provided or it is recognized that a system is safe though abnormality occurs must be avoided where possible. Also, it is necessary to select processing of the safe side in the case of indicating the possibility of abnormality though the abnormality cannot be recognized obviously.

An object of the invention is to provide an information processing apparatus having high reliability, and an information processing method.

Means of Solving the Problems

The invention provides an information processing apparatus comprising: a first device and a second device of which each executes the same processing independently; a sending part which sends a data generated by the second device from the second device to the first device; and a data collating part which collates the data sent from the sending part with a data generated by the first device and determines as abnormal when these data are in disagreement with each other.

According to this information processing apparatus, data generated by the first device is collated with data generated by the second device and when a mismatch between these data occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The information processing apparatus may comprise a processing stop part which stops a processing of the first device when determined as abnormal by the data collating part.

In this case, processing of the first device is stopped in the case of abnormality. A method for stopping the processing is not limited. For example, a signal may be broken at an output stage or the middle of processing or an operation may be stopped by resetting the first device.

In the information processing apparatus, the sending part may be disposed in the second device.

The invention also provides an information processing apparatus comprising: a first device and a second device of which each executes the same processing independently; a sending part which sends a data generated by the first device from the first device to the second device; and a data collating part which collates the data sent from the sending part with a data generated by the second device and determines as abnormal when these data are in disagreement with each other.

According to this information processing apparatus, data generated by the first device is collated with data generated by the second device and when a mismatch between these data occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The information processing apparatus may comprise a processing stop part which stops a processing of the first device when determined as abnormal by the data collating part.

In this case, processing of the first device is stopped in the case of abnormality. A method for stopping the processing is not limited. For example, a signal may be broken at an output stage or the middle of processing or an operation may be stopped by resetting the first device.

In the information processing apparatus, the sending part may be disposed in the first device.

The information processing apparatus may comprise a synchronizing part which synchronizes a processing of the first device and a processing of the second device by use of a timing of sending of the data sent from the sending part.

In this case, processing of the first device and processing of the second device are synchronized, so that data can be collated correctly. Also, processing of the first device and processing of the second device are synchronized using timing of sending of data, so that waiting time necessary for synchronization can be reduced and a reduction in efficiency is prevented.

In the information processing apparatus, the synchronizing part may be disposed in the first device or the second device.

The invention also provides an information processing apparatus comprising: a first device and a second device of which each executes the same processing in synchronization independently; an acquiring part which acquires a data generated by the first device and a data generated by the second device in real time; and a data collating part which collates the data generated by the first device with the data generated by the second device acquired by the acquiring part and determines as abnormal when these data are in disagreement with each other.

According to this information processing apparatus, data generated by the first device is collated with data generated by the second device and when a mismatch between these data occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The information processing apparatus may comprise a processing stop part which stops a processing of the first device when determined as abnormal by the data collating part.

The invention also provides an information processing apparatus comprising: a first device and a second device of which each executes the same processing independently; a first code generating part which generates a first code for error detection based on a data generated by the first device; a second code generating part which generates a second code for error detection based on a data generated by the second device; and a code collating part which collates the first code for error detection generated by the first code generating part with the second code for error detection generated by the second code generating part and determines as abnormal when both the codes are in disagreement with each other.

According to this information processing apparatus, a first code for error detection generated based on data generated by the first device is collated with a second code for error detection generated based on data generated by the second device and when a mismatch between these codes for error detection occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The information processing apparatus may comprise a processing stop part which stops a processing of the first device when determined as abnormal by the code collating part.

In this case, processing of the first device is stopped in the case of abnormality. A method for stopping the processing is not limited. For example, a signal may be broken at an output stage or the middle of processing or an operation may be stopped by resetting the first device.

In the information processing apparatus, the first code generating part may be disposed in the first device and the second code generating part may be disposed in the second device.

In the information processing apparatus, the code collating part may be disposed in the first device or the second device.

The invention also provides an information processing apparatus comprising: a first device and a second device of which each executes the same processing independently with respect to a data having a code for error detection; a first inspecting part which inspects the presence or absence of abnormality of a data having a first code for error detection received by the first device by use of the first code for error detection; a second inspecting part which inspects the presence or absence of abnormality of a data having a second code for error detection received by the second device by use of the second code for error detection; a code collating part which collates the first code for error detection used in the first inspecting part with the second code for error detection used in the second inspecting part; and a determining part which determines as abnormal when: a result of the inspection by the first inspecting part or a result of the inspection by the second inspecting part indicates abnormality; or both the codes for error detection are in disagreement with each other as a result of the collation by the code collating part.

In this case, it is determined that it is abnormal when a mismatch between both the codes for error detection occurs as a result of collation by the code collating part or when a result of inspection by the first inspecting part or a result of inspection by the second inspecting part indicates abnormality, so that the abnormality can be detected surely. Processing in each of the devices is not limited to arithmetic processing, and includes all the processing such as processing for receiving or sending data, processing for outputting data, processing for transferring data or processing for storing data.

In addition, a first inspecting part generates a code for error detection based on data with a first code for error detection received by the first device and the received code for error detection is compared with the generated code for error detection and thereby, the presence or absence of abnormality is inspected. A second inspecting part generates a code for error detection based on data with a second code for error detection received by the second device and the received code for error detection is compared with the generated code for error detection and thereby, the presence or absence of abnormality is inspected.

The "codes for error detection used in the first inspecting part and the second inspecting part" include both of the code for error detection generated by the first inspecting part or the second inspecting part and the code for error detection received by the first inspecting part or the second inspecting part.

The information processing apparatus may comprise a processing stop part which stops a processing of the first device when determined as abnormal by the determining part.

In this case, processing of the first device is stopped in the case of abnormality. A method for stopping the processing is not limited. For example, a signal may be broken at an output stage or the middle of processing or an operation may be stopped by resetting the first device.

In the information processing apparatus, the first inspecting part may be disposed in the first device and the second inspecting part may be disposed in the second device.

In the information processing apparatus, the code collating part may be disposed in the first device or the second device.

The invention also provides an information processing apparatus comprising: a first device and a second device of which each executes the same processing independently; a data collating part which collates a data generated by the first device with a data generated by the second device; a counting part which adds a count number to the data generated by the first device; a count stop part which stops the addition of the count number by the counting part when both the data are in disagreement with each other as a result of the collation by the data collating part; and a determining part which determines abnormality based on the count number added by the counting part.

In this case, a determining part determines abnormality of the device based on the count number added by the counting part, so that the abnormality can be detected without referring to data other than the data generated by the first device.

The information processing apparatus may comprise a processing stop part which stops a processing of the first device or a processing of the second device when determined as abnormal by the determining part.

In this case, processing of the first device or processing of the second device is stopped in the case of abnormality. A method for stopping the processing is not limited. For example, a signal may be broken at an output stage or the middle of processing or an operation may be stopped by resetting the first device or the second device.

In the information processing apparatus, the first device and the second device may be separate semiconductor devices.

In the information processing apparatus, the first device and the second device may be separate CPUs.

In the information processing apparatus, the first device and the second device may be mounted in an insulated state each other.

The invention also provides an information processing method which uses a first device and a second device of which each executes the same processing independently, comprising: a step of sending a data generated by the second device from the second device to the first device; and a step of collating the data sent from the second device with a data generated by the first device and determining as abnormal when these data are in disagreement with each other.

According to this information processing method, data generated by the first device is collated with data generated by the second device and when a mismatch between these data occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The invention also provides an information processing method which uses a first device and a second device of which each executes the same processing independently, comprising: a step of sending a data generated by the first device from the first device to the second device; and a step of collating the data sent from the first device with a data generated by the second device and determining as abnormal when these data are in disagreement with each other.

According to this information processing method, data generated by the first device is collated with data generated by the second device and when a mismatch between these data occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The information processing method may comprise a step of synchronizing a processing of the first device and a processing of the second device by use of timing of sending of the data sent from the second device.

In this case, processing of the first device and processing of the second device are synchronized, so that data can be collated correctly. Also, processing of the first device and processing of the second device are synchronized using timing of sending of data, so that waiting time necessary for synchronization can be reduced and a reduction in efficiency is prevented.

The invention also provides an information processing method which uses a first device and a second device of which each executes the same processing in synchronization independently, comprising: a step of acquiring a data generated by the first device and a data generated by the second device in real time; and a step of collating the data generated by the first device with the data generated by the second device and determining as abnormal when these data are in disagreement with each other.

According to this information processing method, data generated by the first device is collated with data generated by the second device and when a mismatch between these data occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The invention also provides an information processing method which uses a first device and a second device of which each executes the same processing independently comprising: a first code generating step of generating a first code for error detection based on a data generated by the first device; a second code generating step of generating a second code for error detection based on a data generated by the second device; and a step of collating the first code for error detection with the second code for error detection and determining as abnormal when both the data are in disagreement with each other.

According to this information processing method, a first code for error detection generated based on data generated by the first device is collated with a second code for error detection generated based on data generated by the second device and when a mismatch between these codes for error detection occurs, it is determined that it is abnormal, so that abnormality can be detected surely. Processing in each of the devices is not limited to arithmetic processing, and includes all the processing such as processing for receiving or sending data, processing for outputting data, processing for transferring data or processing for storing data.

The invention also provides an information processing method which uses a first device and a second device of which each executes the same processing independently with respect to a data having a code for error detection, comprising: a first inspection step of inspecting the presence or absence of abnormality of a data having a first code for error detection received by the first device by use of the first code for error detection; a second inspection step of inspecting the presence or absence of abnormality of a data having a second code for error detection received by the second device by use of the second code for error detection; a code collation step of collating the first code for error detection used in the first inspection step with the second code for error detection used in the second inspection step; and a step of determining as abnormal when: a result of the inspection by the first inspection step or a result of the inspection by the second inspection step indicates abnormality; or both the codes for error detection are in disagreement each other as a result of the collation by the code collation step.

In this case, it is determined that it is abnormal when a mismatch between both the codes for error detection occurs as a result of collation by the code collation step or when a result of inspection by the first inspection step or a result of inspection by the second inspection step indicates abnormality, so that the abnormality can be detected surely. Processing in each of the devices is not limited to arithmetic processing, and includes all the processing such as processing for receiving or sending data, processing for outputting data, processing for transferring data or processing for storing data.

The invention also provides an information processing method which uses a first device and a second device which executes the same processing independently, comprising: a step of collating a data generated by the first device with a data generated by the second device; a step of adding a count number to the data generated by the first device; a step of stopping the addition of the count number when both the data are in disagreement each other as a result of the data collation; and a step of determining abnormality based on the added count number.

In this case, abnormality is determined based on the added count number, so that the abnormality can be detected without referring to data other than the data generated by the first device. Processing in each of the devices is not limited to arithmetic processing, and includes all the processing such as processing for receiving or sending data, processing for outputting data, processing for transferring data or processing for storing data.

Advantageous Effects of the Invention

According to the information processing apparatus and the information processing method, data generated by the first device is collated with data generated by the second device and when a mismatch between these data occurs, it is determined that it is abnormal, so that abnormality can be detected surely.

BRIEF DESCRIPTION OF THE DRAWINGS

FIGS. 7 (a) and (b) are diagrams showing configurations of communication frames and FIG. 7(a) shows a configuration of individual communication frames and FIG. 7(b) shows an operation of the case where a communication state is normal.

DESCRIPTION OF THE REFERENCE NUMERALS AND SIGNS

101 Sending Part
102 Data Collating Part
103 Processing Stop Part
104 Synchronizing Part
105 Acquiring Part
106 First Code Generating Part
107 Second Code Generating Part
108 Code Collating Part
109 Processing Stop Part
111 First Inspecting Part
112 Second Inspecting Part
113 Code Collating Part
114 Determining Part
115 Processing Stop Part
116 Data Collating Part
117 Counting Part
118 Count Stop Part
119 Determining Part
120 Processing Stop Part

BEST MODE FOR CARRYING OUT THE INVENTION

FIG. 1(a) to FIG. 3(b) are block diagrams functionally showing an information processing apparatus according to the invention.

Figure 1A:
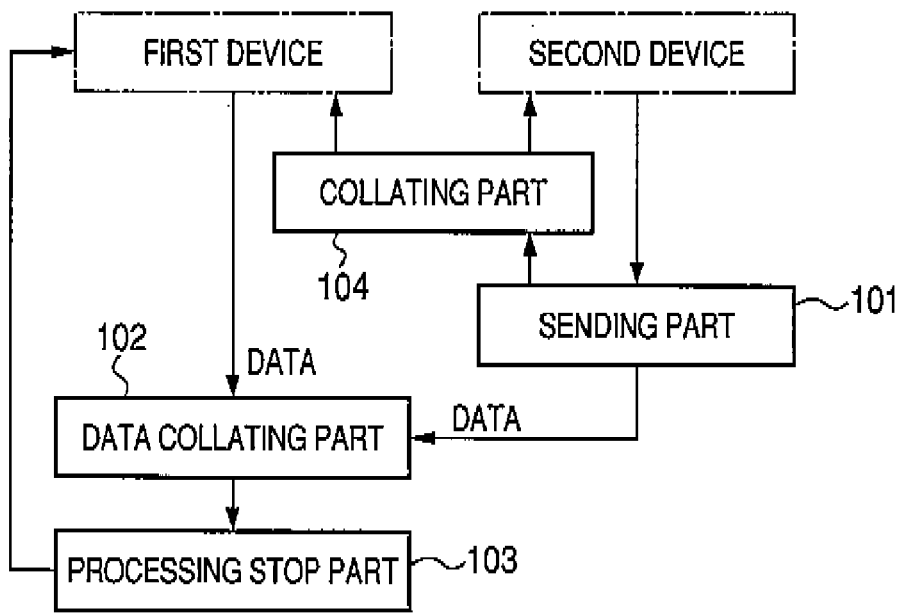
FIGS. 1 (a) and (b) are block diagrams functionally showing an information processing apparatus according to the invention.

In a form shown in FIG. 1(a), a sending part 101 sends data generated by a second device from the second device to a first device. A data collating part 102 collates data sent from the sending part 101 with data generated by the first device, and when a mismatch between these data occurs, it is determined that it is abnormal.

A processing stop part 103 stops processing of the first device when the data collating part 102 determines that it is abnormal.

A synchronizing part 104 synchronizes processing of the first device and processing of the second device using timing of sending of data sent from the sending part 101.

Figure 1B:
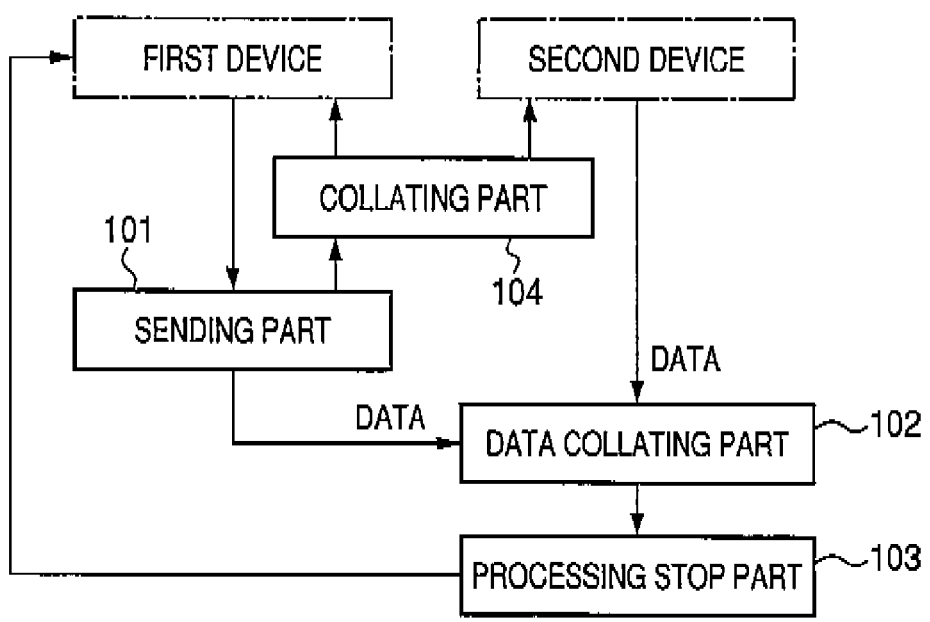

In a form shown in FIG. 1(b), the sending part 101 sends data generated by the first device from the first device to the second device. The data collating part 102 collates data sent from the sending part 101 with data generated by the second device, and when a mismatch between these data occurs, it is determined that it is abnormal.

The processing stop part 103 stops processing of the first device when the data collating part 102 determines that it is abnormal.

The synchronizing part 104 synchronizes processing of the first device and processing of the second device using timing of sending of data sent from the sending part 101.

Figure 2A:
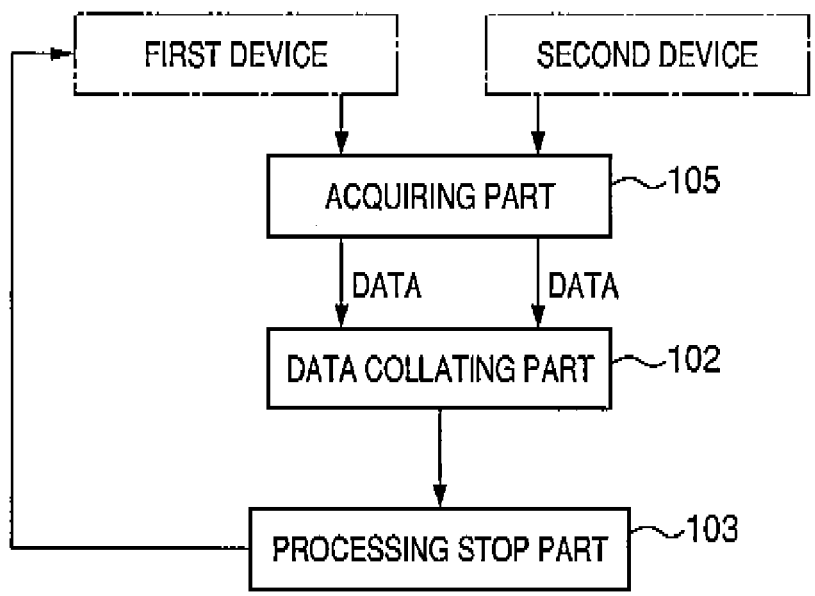
FIGS. 2 (a) and (b) are block diagrams functionally showing an information processing apparatus according to the invention.

In a form shown in FIG. 2(a), an acquiring part 105 acquires data generated by the first device and data generated by the second device in real time. The data collating part 102 collates data generated by the first device with data generated by the second device acquired by the acquiring part 105, and when a mismatch between these data occurs, it is determined that it is abnormal.

The processing stop part 103 stops processing of the first device when the data collating part determines that it is abnormal.

Figure 2B:
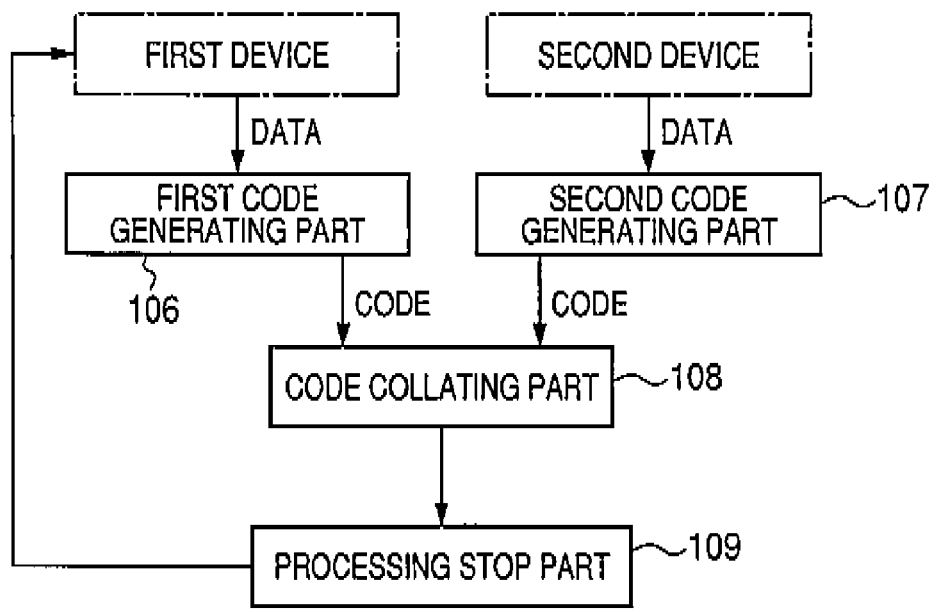

In a form shown in FIG. 2(b), a first code generating part 106 generates a first code for error detection based on data generated by the first device. A second code generating part 107 generates a second code for error detection based on data generated by the second device. A code collating part 108 collates the first code for error detection generated by the first code generating part 106 with the second code for error detection generated by the second code generating part 107, and when a mismatch between both the codes for error detection occurs, it is determined that it is abnormal.

A processing stop part 109 stops processing of the first device when the code collating part 108 determines that it is abnormal.

Figure 3A:
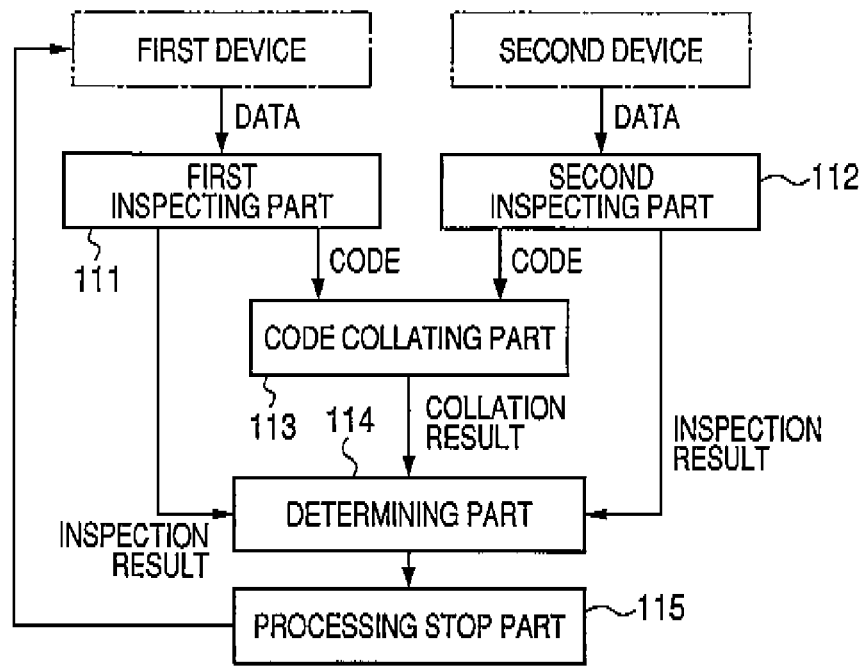
FIGS. 3 (a) and (b) are block diagrams functionally showing an information processing apparatus according to the invention.

In a form shown in FIG. 3(a), a first inspecting part 111 inspects the presence or absence of abnormality of data with a first code for error detection received by the first device using the first code for error detection. A second inspecting part 112 inspects the presence or absence of abnormality of data with a second code for error detection received by the second device using the second code for error detection. A code collating part 113 collates the first code for error detection used in the first inspecting part 111 with the second code for error detection used in the second inspecting part 112. A determining part 114 determines that it is abnormal when a mismatch between both the codes for error detection occurs as a result of collation by the code collating part 113 or when a result of inspection by the first inspecting part 111 or a result of inspection by the second inspecting part 112 indicates abnormality.

A processing stop part 115 stops processing of the first device when the determining part 114 determines that it is abnormal.

Figure 3B:
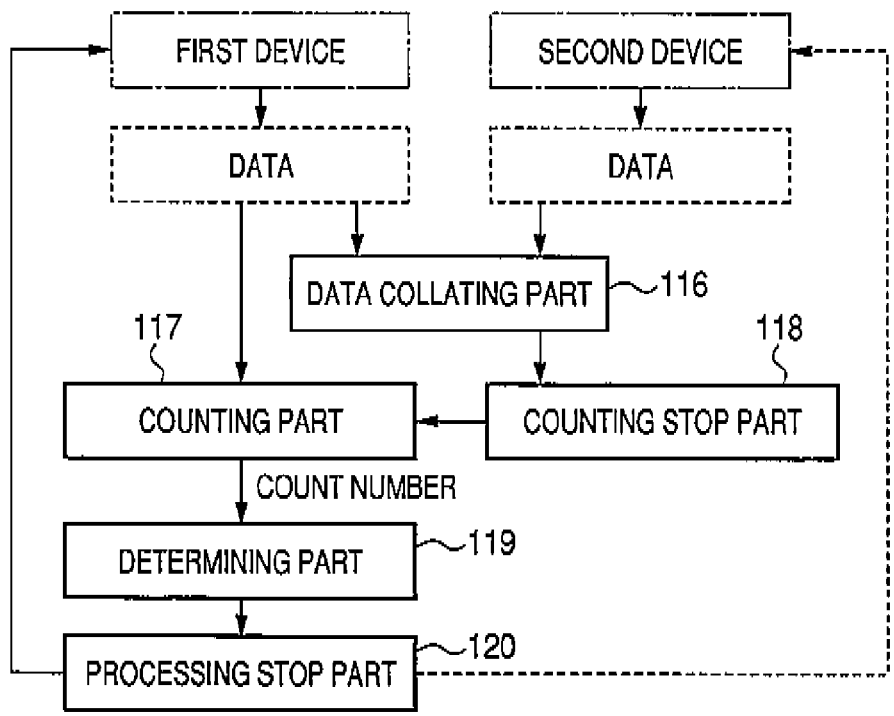

In a form shown in FIG. 3(b), a data collating part 116 collates data generated by the first device with data generated by the second device. A counting part 117 adds a count number to the data generated by the first device. A count stop part 118 stops addition of the count number by the counting part 117 when a mismatch between both the data occurs as a result of collation by the data collating part 116. A determining part 119 determines abnormality based on the count number added by the counting part 117.

A processing stop part 120 stops processing of the first device or processing of the second device when the determining part 119 determines that it is abnormal.

First to fourth embodiments of the information processing apparatus according to the invention will be described below with reference to FIGS. 4 to 10.

First Embodiment

Figure 4:
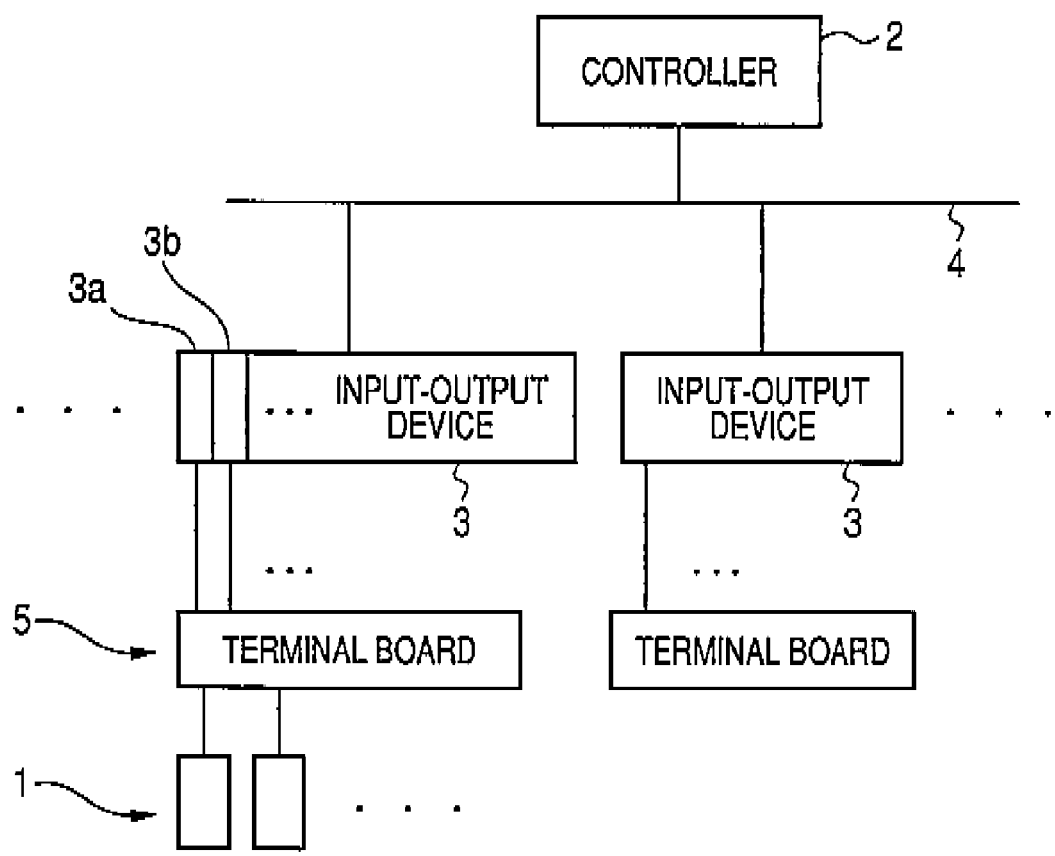
FIG. 4 is a block diagram showing a configuration of a safety system to which an information processing apparatus of a first embodiment is applied.

FIG. 4 is a block diagram showing a configuration of a safety system to which the information processing apparatus of the first embodiment is applied. This safety system is configured as a part of a plant control system.

As shown in FIG. 4, the plant control system comprises a controller 2 for integrally managing and controlling field devices 1, 1, . . . such as a sensor or an electromagnetic valve arranged in each part of a plant, and input-output devices 3, 3, . . . interposed between the controller 2 and the field devices 1. The input-output devices 3, 3, . . . are connected to the controller 2 through a network 4. Also, the field devices 1, 1, . . . are connected to the input-output devices 3 through terminal boards 5.

As shown in FIG. 4, input-output units 3a, 3b, . . . for executing interface processing between the field devices 1 and the controller 2 are mounted in the input-output devices 3. As described below, in these input-output units 3a, 3b, . . . , the same processing is executed mutually independently for the purpose of improving reliability.

Figure 5:
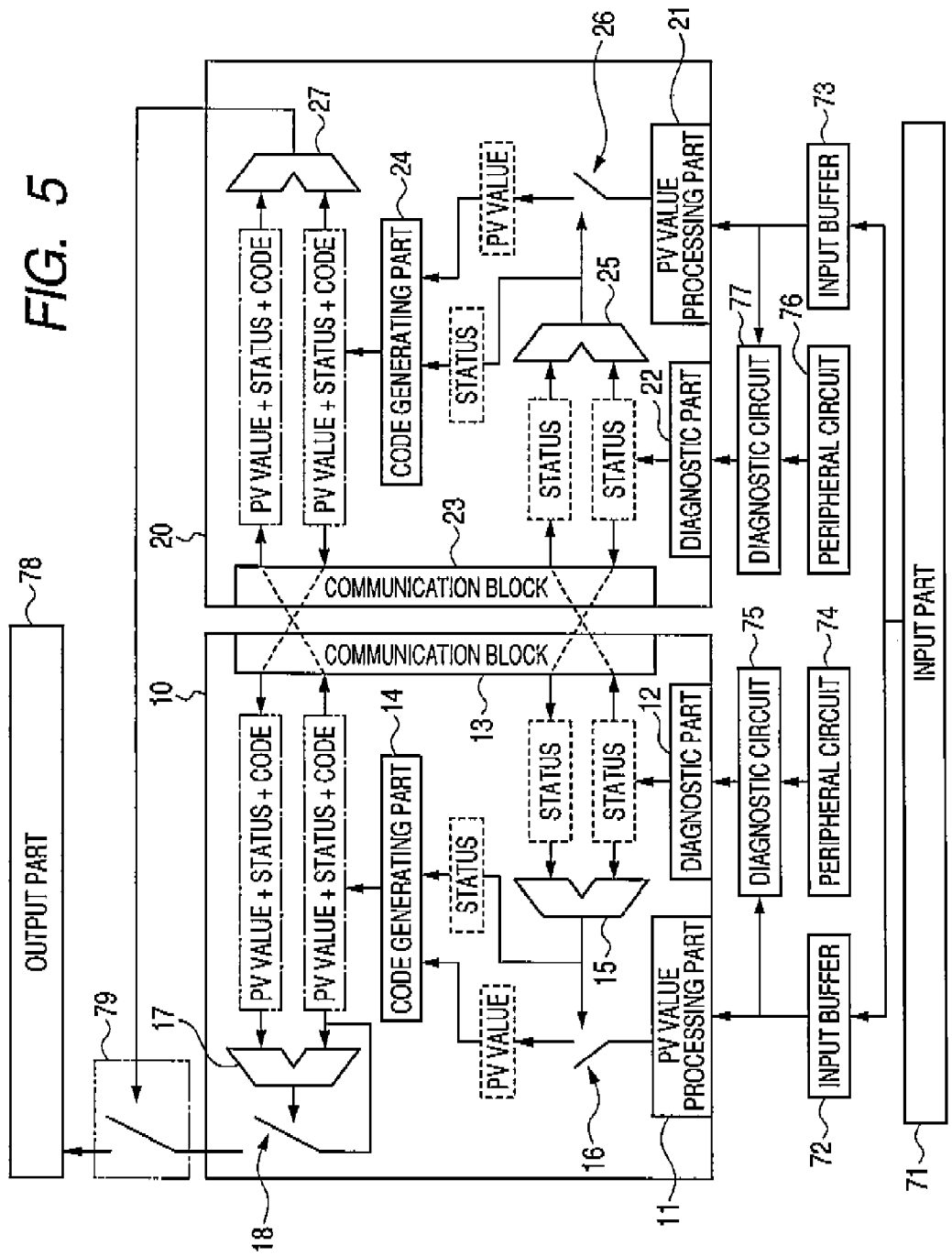
FIG. 5 is a block diagram showing a part of the configuration of the information processing apparatus of the first embodiment.

FIG. 5 is a block diagrams showing a part of the configuration of the input-output unit 3a. In FIG. 5, an example of a unit for processing an input value inputted from the side of the field device 1 which is a downstream process and outputting a PV value (process value) to the side of the controller 2 which is an upstream process is shown.

As shown in FIG. 5, this unit comprises a master CPU 10 and a slave CPU 20, and the respective CPU 10 and CPU 20 execute the same processing mutually independently. Also, the CPU 10 and the CPU 20 execute diagnosis of peripheral circuits mounted in the respective peripheries.

As shown in FIG. 5, an input value from the field device 1 is inputted to the master CPU 10 through an input part 71 and an input buffer 72. A peripheral circuit 74 of the periphery of the master CPU 10 is diagnosed by a diagnostic circuit 75. Also, a signal outputted from the input buffer 72 is inputted to the diagnostic circuit 75 and the presence or absence of abnormality of the signal is diagnosed. The presence or absence of abnormality of the peripheral circuit 74 and the presence or absence of abnormality of the signal outputted from the input buffer 72 are inputted to the master CPU 10 as diagnostic information from the diagnostic circuit 75.

Similarly, the same input value from the field device 1 is inputted to the slave CPU 20 through the input part 71 and an input buffer 73. A peripheral circuit 76 of the periphery of the slave CPU 20 is diagnosed by a diagnostic circuit 77. Also, a signal outputted from the input buffer 73 is inputted to the diagnostic circuit 77 and the presence or absence of abnormality of the signal is diagnosed. The presence or absence of abnormality of the peripheral circuit 76 and the presence or absence of abnormality of the signal outputted from the input buffer 73 are inputted to the slave CPU 20 as diagnostic information from the diagnostic circuit 77.

As shown in FIG. 5, the master CPU 10 comprises a PV value processing part 11 for executing arithmetic processing with respect to an input value inputted via the input buffer 72 and making conversion into a PV value (process value) of a format capable of processing in an upstream process which is the side of the controller 2, and a diagnostic part 12 for receiving diagnostic information from the diagnostic circuit 75 and executing abnormal detection and determining and generating a status which is a diagnostic result.

Also, the master CPU 10 comprises a communication block 13 for executing communication with the slave CPU 20, and a code generating part 14 for adding a CRC (Cyclic Redundancy Check) code and an update counter to a PV value and a status.

Also, the slave CPU 20 comprises a PV value processing part 21 for executing arithmetic processing with respect to an input value inputted via the input buffer 73 and making conversion into a PV value (process value) of a format capable of processing in the upstream process which is the side of the controller 2, and a diagnostic part 22 for receiving diagnostic information from the diagnostic circuit 77 and executing abnormal detection and determining and generating a status which is a diagnostic result.

Also, the slave CPU 20 comprises a communication block 23 for executing communication with the master CPU 10, and a code generating part 24 for adding a CRC (Cyclic Redundancy Check) code and an update counter to a PV value and a status.

Next, an operation of the present unit will be described.

In the master CPU 10, a status generated by the diagnostic part 12 and a status which is generated by the diagnostic part 24 of the slave CPU 20 and is acquired through communication by the communication block 23 and the communication block 13 are compared and equalized in an equalization part 15. Equalization is processing for equalizing a status handled by the master CPU 10 and a status handled by the slave CPU 20. In the equalization part 15, OR information about the statuses is generated. That is, when either status indicates abnormality in the equalization part 15, its abnormality is changed to the captured status and is passed to the code generating part 14. As described below, the statuses handled by the master CPU 10 and the slave CPU 20 are shared by performing similar processing also in the slave CPU 20.

A PV value generated by the PV value processing part 11 is given to the code generating part 14. However, when abnormality of a status is detected based on processing in the equalization part 15, an input of the PV value to the code generating part 14 is broken by a breaking part 16.

In the code generating part 14, a CRC code is generated based on the status generated by the equalization part 15 and the inputted PV value. Also, every time new PV value and status are inputted, a count number is updated and a code added to a CRC code is generated. In the code generating part 14, a frame made of the PV value, the status, the CRC code and the count number is generated by adding the code generated thus to the PV value and the status. The count number is incremented every update of the PV value and the status.

A frame similar to the frame created by the code generating part 14 is similarly generated by the code generating part 24 of the slave CPU 20 and is acquired through communication by the communication block 23 and the communication block 13. The frame created by the code generating part 14 and the frame created by the code generating part 24 are collated in a comparing part 17. The comparing part 17 decides that it is abnormal when a mismatch between both the frames is detected. As described below, by performing similar processing also in the slave CPU 20, the master CPU 10 and the slave CPU 20 mutually collate the other processing result with my processing result and decide that it is abnormal when a mismatch occurs. When all the processing in the master CPU 10 and the slave CPU 20 is normal, both the frames match as a result of collation in the comparing part 17.

The frame generated by the code generating part 14 is outputted to an output part 78 which is an upstream process. However, a mismatch between both the frames is detected in the comparing part 17 and in the case of deciding that it is abnormal, an output of the frame is broken by a breaking part 18. Also, as described below, when a mismatch between the frames is detected in a comparing part 27 of the slave CPU 20, an output of the frame is broken in a fail-safe part 79.

On the other hand, in the slave CPU 20, a status generated by the diagnostic part 22 and a status which is generated by the diagnostic part 14 of the master CPU 10 and is acquired through communication by the communication block 13 and the communication block 23 are compared and equalized in an equalization part 25. In the equalization part 25, OR information about the statuses is generated. That is, when either status indicates abnormality in the equalization part 25, its abnormality is changed to the captured status and is passed to the code generating part 24.

A PV value generated by the PV value processing part 21 is given to the code generating part 24. However, when abnormality of a status is detected based on processing in the equalization part 25, an input of the PV value to the code generating part 24 is broken by a breaking part 26.

In the code generating part 24, a CRC code is generated based on the status generated by the equalization part 25 and the inputted PV value. Also, every time new PV value and status are inputted, a count number is updated and a code added to a CRC code is generated. In the code generating part 24, a frame made of the PV value, the status, the CRC code and the count number is generated by adding the code generated thus to the PV value and the status. The count number is incremented every update of the PV value and the status.

The frame created by the code generating part 24 is collated with a frame which is similarly generated by the code generating part 14 of the master CPU 10 and is acquired through communication by the communication block 13 and the communication block 23 in a comparing part 27. It is decided that it is abnormal when a mismatch between both the frames is detected in the comparing part 27.

When the mismatch between the frames is detected in the comparing part 27, a fail-safe signal indicating abnormality is outputted from the comparing part 27 and is given to the fail-safe part 79. In this case, in the fail-safe part 79, an output of a frame from the CPU 10 is broken and a new frame to the output part 78 is inhibited. Instead of breaking an output by the fail-safe part 79, a reset signal may be outputted from the CPU 20 to a reset circuit of the CPU 10. In this case, the CPU 10 receiving the reset signal is forcedly reset and an output to the output part 78 is inhibited.

When the output to the output part 78 is inhibited, update of the count number is stopped, so that it can be recognized that an output of information is stopped by only referring to the count number in an upstream process of a subsequent stage after the output part 78.

Next, a method of communication between the master CPU 10 and the slave CPU 20 will be described. As described above, in the master CPU 10 and the slave CPU 20, data is exchanged in real time and the data is collated. As a result of this, when timing of processing in both the CPUs is off, separate processing results different in a time axis direction are compared and a mismatch of collation occurs. As a result of this, it is necessary for both the CPUs to always execute the same operation in the apparatus of the present embodiment. Therefore, control is performed so that a timing phase trigger is sent from the side of the master CPU 10 using asynchronous communication (UART) and the slave CPU 20 can execute processing in the same sequence in synchronization.

Figure 6:
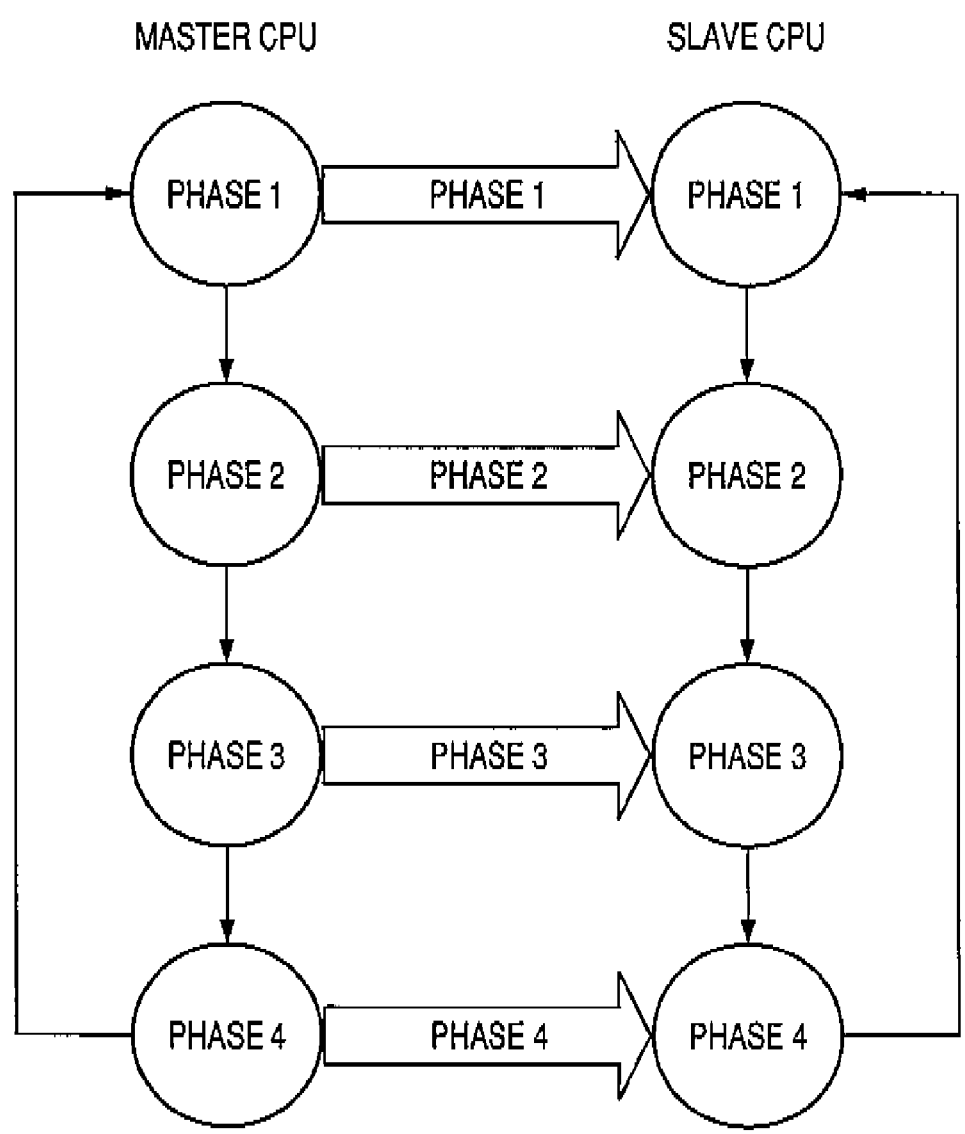
FIG. 6 is a diagram showing sequence of communication processing.
Figure 7A:
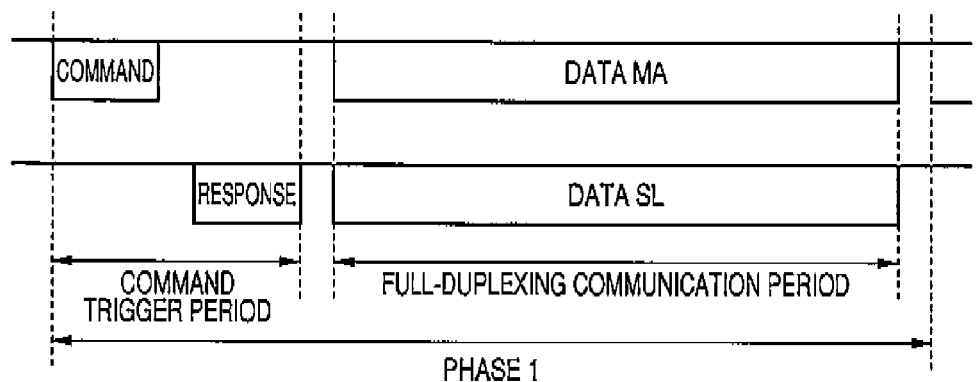
Figure 7B:
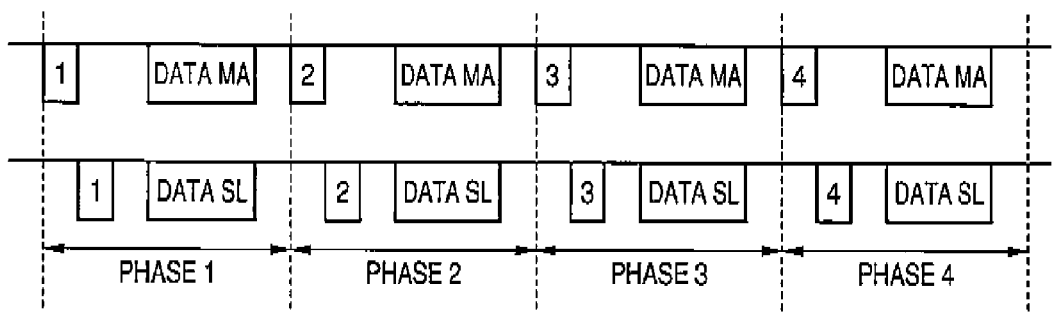

FIG. 6 is a diagram showing sequence of communication processing. FIG. 7(*a*) and FIG. 7(*b*) are diagrams showing configurations of communication frames, and FIG. 7(*a*) shows a configuration of individual communication frames, and FIG. 7(*b*) shows an operation of the case where a communication state is normal.

As shown in FIG. 6, the master CPU 10 sends a command with a timing phase trigger to the slave CPU 20 in a constant cycle. The slave CPU 20 receiving the command replies a response to the master CPU 10. After such processing, both the CPUs execute the same phase and thereby processing of both the CPUs is synchronized.

As shown in FIG. 7(*a*), the master CPU 10 sends a command with a timing phase trigger through the communication block 13. The slave CPU 20 receives the command through the communication block 23. In the slave CPU 20, a phase (sequence number) represented in the received command is compared with an expected phase (sequence number), that is, a phase (phase 1 in FIG. 7(*a*)) to be processed next and when both the phases match, it is recognized that a communication state is normal. In the case of recognizing that the communication state is normal, the slave CPU 20 replies a response including information (sequence number) indicating the phase (phase 1 in FIG. 7(*a*)) to the master CPU 10 through the communication block 23. The master CPU 10 recognizes that a communication state is normal when the response from the slave CPU 20 is received within a certain time and a phase (sequence number) represented in the received response is proper.

After a command trigger period for which a communication state is recognized by sending and receiving of the command and the response, it shifts to a full-duplexing communication period. For the full-duplexing communication period, the master CPU 10 and the slave CPU 20 respectively execute processing of the same phase (phase 1 in FIG. 7(*a*)), and data MA is sent from the master CPU 10 to the slave CPU 20 and data SL is sent from the slave CPU 20 to the master CPU 10, concurrently. The data MA and the data SL include the frame (frame made of a PV value, a status, a CRC code and a count number) sent and received for collation and the status sent and received for equalization described above, respectively.

As shown in FIG. 7(*b*), by sequentially repeating such phases, the same processing is executed in synchronization with each other in the master CPU 10 and the slave CPU 20.

As described above, in the first embodiment, CRC codes are generated by both the CPUs and collation is executed by data (frames) with CRC, so that reliability of the collation increases. Also, only when both the data match as a result of the collation by both the CPUs, information is notified of an upstream process and when any one of the CPUs determines that it is abnormal, an output of information to the upstream process is surely prevented. As a result of this, reliability of the information outputted to the upstream process can be increased. That is, the fact that a CRC code is normal by inspection in the upstream process means that its data is data with high reliability collated between the CPUs inside the input-output unit 3*a*. Also, in the upstream process, by inspecting the CRC code, the presence or absence of abnormality can be diagnosed again over all the processes of handling data with CRC inside the CPU.

Also, using communication between CPUs, data with CRC is sent and received and is collated by both the CPUs, so that it is unnecessary to separately make a check of frames of communication between CPUs, for example, a check of frame sum, parity, etc.

The first embodiment is constructed so as to synchronize processing every phase using timing of communication between CPUs. As a result of this, it is unnecessary to perform useless processing for synchronization and reduction in performance resulting from synchronization processing does not occur. That is, extra processing is not required by only inserting a sequence number for identifying a phase into the primarily essential contents of communication. Also, both the CPUs always execute the same phase in synchronization with each other by such synchronization, so that accuracy of data collation between the CPUs can be increased. On the other hand, both the CPUs simultaneously follow a transient state change caused by a factor of the outside of the CPU, so that a sudden collation mismatch between data does not occur. Also, the CPU 20 basically has a relation of executing a phase specified from the CPU 10, so that return can be made easily even in the case of going out of synchronization between phases.

In the first embodiment, statuses generated by each of the CPUs are equalized at the previous stage of mutually collating data of both the CPUs. As a result of this, when abnormality of the status is detected in either CPU, both the CPUs share recognition that the status is abnormal by equalization of the statuses. Because of this, at the time of abnormality of the status, a collation mismatch between data at the subsequent stage does not occur and the status abnormality can be recognized separately from the collation mismatch between data. As a result of this, notification of an abnormal state can be provided correctly. Such status equalization is particularly more effective in the case where it is necessary to loosely couple CPUs by decreasing a common circuit part between the CPUs even though an independent peripheral circuit is increased every CPU. Also, it is effective in the case where a peripheral circuit can be diagnosed in only one CPU.

The processing of equalization, addition of a CRC code, sequence of data collation, etc. shown in the first embodiment can be implemented easily by a program of the CPU. Also, communication between CPUs can be implemented easily using an asynchronous communication (UART) function normally mounted in the CPUs. Also, by using serial communication as the communication between CPUs, mounting is facilitated even when two CPUs are mounted in the side of a controller and the side of a field device insulated mutually.

Second Embodiment

An information processing apparatus of a second embodiment shows an example in which a master CPU and a slave CPU are mounted in a mutually insulated state.

Figure 8:
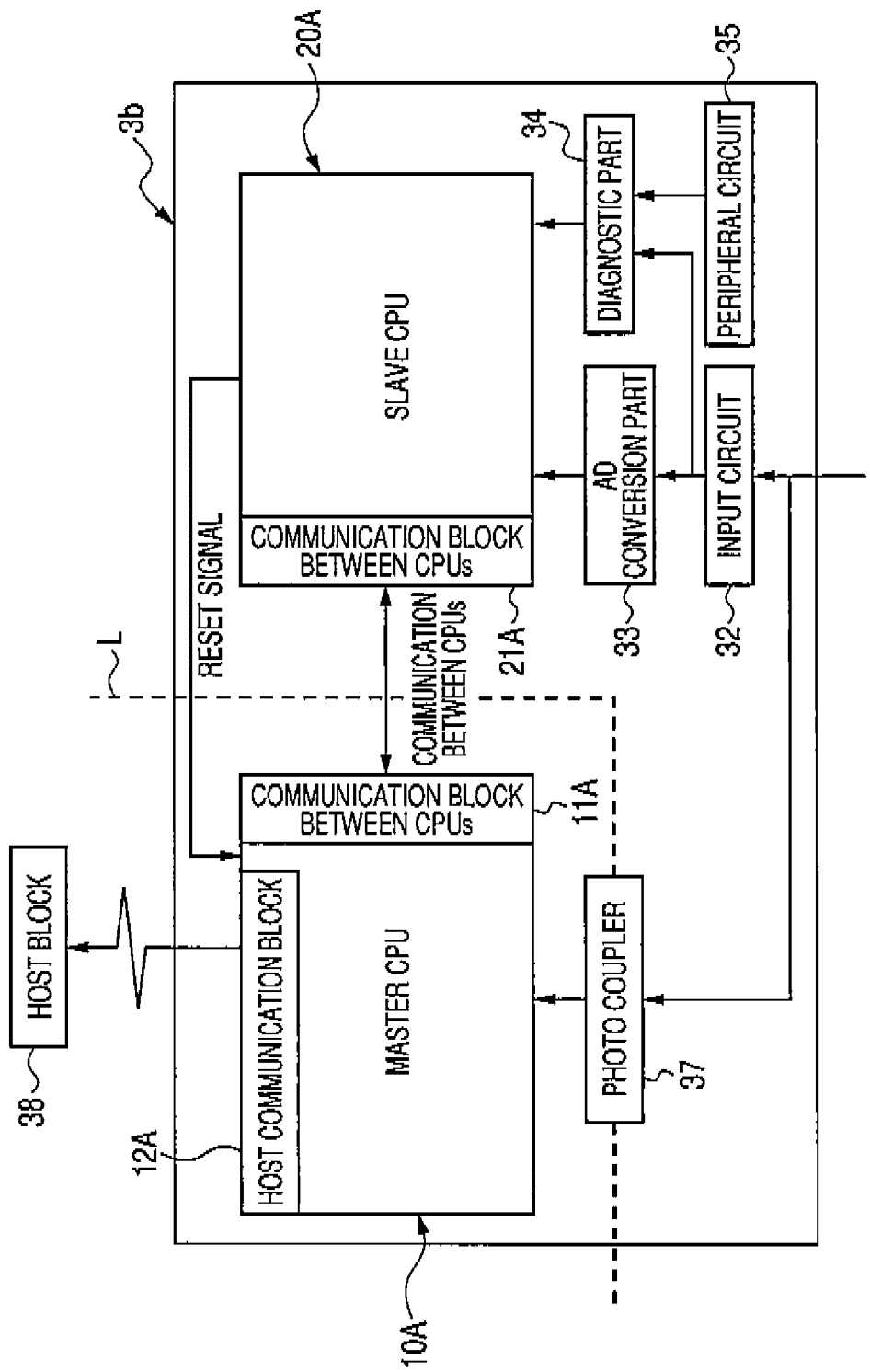
FIG. 8 is a block diagram showing a configuration of an information processing apparatus of a second embodiment.

FIG. 8 is a block diagram showing a configuration of an input-output unit as the information processing apparatus of the second embodiment.

In the plant control system as shown in FIG. 4, the controller 2 and the field devices 1 are usually spaced. Therefore, grounds of the field devices 1 and the controller 2 are disposed in a mutually separated state for the purpose of escaping the influence of a thunderbolt or noise propagating the surface of earth. As a result of this, it is necessary to maintain an electrically insulated state between the side of the controller 2 and each of the field devices 1.

In an input-output unit 3*b* shown in FIG. 8, a master CPU 10A is disposed in the side (upstream side) of the controller 2 and a slave CPU 20A is disposed in the side (downstream side) of the field devices 1 through an insulation boundary L. An analog input value from the downstream side is converted into a digital signal in an AD conversion part 33 via an input circuit 32 and is inputted to the slave CPU 20A. Information, which shares a ground potential with the slave CPU 20A, from a peripheral circuit 35 is given to a diagnostic part 34 and also an input value outputted from the input circuit 32 is given to the diagnostic part 34. In the diagnostic part 34, diagnostic information based on the input value outputted from the input circuit 32 and the information from the peripheral circuit 35 is given to the slave CPU 20A.

On the other hand, the input value from the downstream side is also inputted to the master CPU 10A through a photo coupler 37. The analog input value is binarized in the photo coupler 37. Processing based on a binarized signal (digital signal) is executed in the master CPU 10A.

In addition, the input value is constructed of plural channels (for example, 8 channels), and units of the number corresponding to the number of channels are prepared in the input circuit 32, the AD conversion part 33 and the photo coupler 37.

The master CPU 10A and the slave CPU 20A send and receive a command with a timing phase trigger and a response to the command through a communication block 11A between CPUs and a communication block 21A between CPUs disposed respectively. Consequently, the same processing is executed in synchronization mutually independently. Also, the master CPU 10A and the slave CPU 20A send and receive mutual data through the communication block 11A between CPUs and the communication block 21A between CPUs and respectively collate the data. Further, diagnostic information obtained in the slave CPU 20A is also sent to the master CPU 10A and statuses are equalized.

In the master CPU 10A, a host block 38 is notified of data through a host communication block 12A only when both the data match as a result of collation between the data of the master CPU 10A and the slave CPU 20A without indicating abnormality of the equalized statuses. Also, when a mismatch between data of the master CPU 10A and the slave CPU 20A is detected in the slave CPU 20A, a reset signal is sent out to the master CPU 10A. In this case, the master CPU 10A is forcedly changed in a reset state by the reset signal and notification of data from the master CPU 10A to the host block 38 is inhibited. In addition, transmission lines of the reset signal and a path of communication between CPUs are insulated between the master CPU 10A and the slave CPU 20A by a photo coupler etc. in the insulation boundary L.

In the unit 3*b* shown in FIG. 8, the slave CPU 20A is mounted in the side of the field devices 1, so that an input value via the input circuit 32 or information from the peripheral circuit 35 mounted in the side of the field devices 1 can be captured easily and a detailed diagnosis can be made. Also, by using asynchronous communication (UART) etc., the communication between CPUs can be executed by a small number of communication lines, so that an insulated state can be maintained easily. As a result of this, the statuses which are diagnostic information are equalized between both the CPUs by the communication between CPUs and thereby, a detailed diagnostic result in the slave CPU 20A can also be effectively utilized in the master CPU 10A.

Third Embodiment

Figure 9:
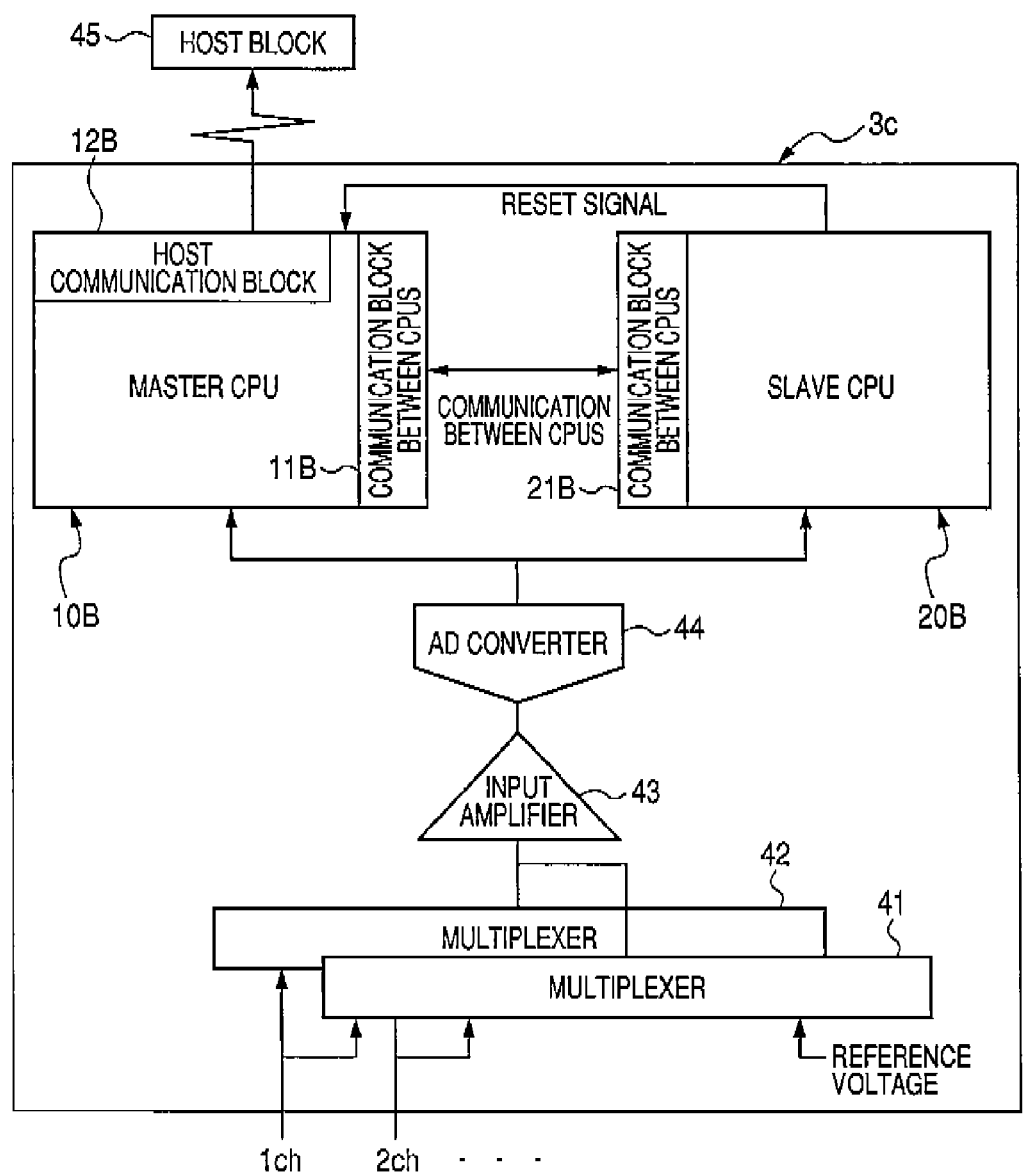
FIG. 9 is a block diagram showing a configuration of an information processing apparatus of a third embodiment.

An information processing apparatus of a third embodiment shows an example of an input-output unit in which an analog signal from the side of the field devices 1 (FIG. 4) is converted into a digital signal and two CPUs receive the common digital signal and data is outputted to the side of the controller 2 (FIG. 4). FIG. 9 is a block diagram showing a configuration of the input-output unit as the information processing apparatus of the third embodiment.

An input-output unit 3c shown in FIG. 9 comprises a master CPU 10B and a slave CPU 20B for executing the same processing mutually independently, a main multiplexer 41 and a sub multiplexer 42 for receiving analog signals of plural channels (for example, 8 channels) and selecting one signal, an input amplifier 43 for receiving the analog signal from the multiplexer 41, and an AD converter 44 for converting a signal outputted from the input amplifier 43 into a digital signal and giving the signal to the master CPU 10B and the slave CPU 20B.

Output signals of the main multiplexer 41 and the sub multiplexer 42 are respectively compared in the master CPU 10B and the slave CPU 20B and in the case of a mismatch, it is decided that a status is abnormal. Also, the statuses are exchanged by communication between CPUs and the statuses are equalized. Consequently, soundness of an operation of the multiplexer 41 is diagnosed. Also, the input amplifier 43 and the AD converter 44 are common to all the channels, and the statuses are monitored by inputting a reference voltage to the input amplifier 43 through the multiplexer 41 in a constant cycle and respectively checking an output of the AD converter 44 by the master CPU 10B and the slave CPU 20B. Also in this case, the statuses are exchanged by communication between CPUs and the statuses are equalized.

The master CPU 10B and the slave CPU 20B send and receive a command with a timing phase trigger and a response to the command through a communication block 11B between CPUs and a communication block 21B between CPUs disposed respectively and thereby, the same processing is executed in synchronization mutually independently. Also, statuses obtained by the master CPU 10B and the slave CPU 20B are exchanged by communication between CPUs and the statuses are equalized. Further, the master CPU 10B and the slave CPU 20B send and receive mutual data through the communication block 11B between CPUs and the communication block 21B between CPUs and collate the data.

In the master CPU 10B, a host block 45 is notified of data through a communication block 12B only when both the data match as a result of collation between the data of the master CPU 10B and the slave CPU 20B without indicating abnormality of the equalized statuses. Also, when a mismatch between data of the master CPU 10B and the slave CPU 20B is detected in the slave CPU 20B, a reset signal is sent out to the master CPU 10B. In this case, the master CPU 10B is forcedly changed in a reset state by the reset signal and notification of data from the master CPU 10B to the host block 45 is inhibited.

Fourth Embodiment

Figure 10:
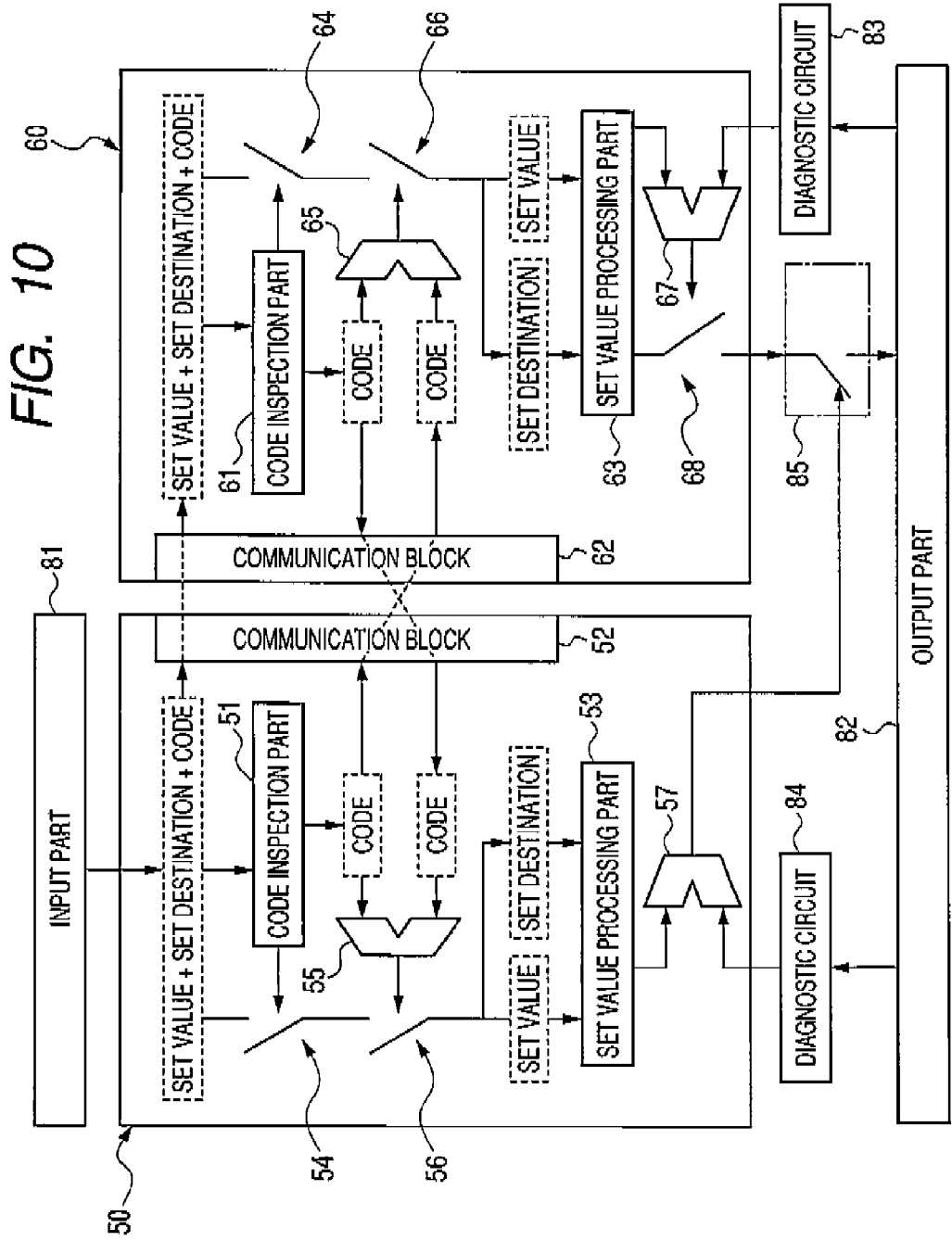
FIG. 10 is a block diagram showing a part of a configuration of an information processing apparatus of a fourth embodiment.

An information processing apparatus of a fourth embodiment shows an example of an input-output unit in which data with a CRC code inputted from the side (upstream side) of the controller 2 (FIG. 4) is outputted to the side (downstream side) of the field devices 1 (FIG. 4). FIG. 10 is a block diagram showing a part of a configuration of the input-output unit as the information processing apparatus of the fourth embodiment.

The input-output unit shown in FIG. 10 comprises a CPU 50 and a CPU 60 for executing processing mutually independently.

The CPU 50 comprises a code inspecting part 51 for inspecting a CRC code based on data inputted via an input part 81, a communication block 52 for executing communication with the CPU 60, and a set value processing part 53 for converting the inputted data into a format used in the side of the field devices 1.

The CPU 60 comprises a code inspecting part 61 for inspecting a CRC code based on data transferred from the CPU 50, a communication block 62 for executing communication with the CPU 50, and a set value processing part 63 for converting the inputted data into a format used in the side of the field devices 1.

Next, an operation of the input-output unit shown in FIG. 10 will be described.

Data from the side of the controller 2 is inputted to the CPU 50 through the input part 81. This data includes a set destination for identifying the field device 1 (for example, an electromagnetic valve), a set value (for example, an opening of an electromagnetic valve) to be set in the set destination, and a CRC code created based on data of the set destination and the set value.

The data inputted to the CPU 50 is given to the code inspecting part 51. In the code inspecting part 51, a CRC code is created based on data of the set destination and the set value received. Then, a CRC code received as data is compared with the CRC code created in the code inspecting part 51. The code inspecting part 51 decides that it is abnormal when a mismatch between both the CRC codes occurs, and in this case, data is broken in a breaking part 54.

On the other hand, the data inputted to the CPU 50 is sent through the communication block 52. The sent data is received by the CPU 60 through the communication block 62.

The data received by the CPU 60 is given to the code inspecting part 61. In the code inspecting part 61, a CRC code is created based on data of the set destination and the set received. Then, a CRC code received as data is compared with the CRC code created in the code inspecting part 61. The code inspecting part 61 decides that it is abnormal when a mismatch between both the CRC codes occurs, and in this case, data is broken in a breaking part 64.

Then, the CRC code created in the code inspecting part 51 of the CPU 50 is sent through the communication block 52. The sent CRC code is received by the CPU 60 through the communication block 62. Also, the CRC code created in the code inspecting part 51 of the CPU 50 is compared with the CRC code sent from the CPU 60 in a comparing part 55.

The comparing part 55 decides that it is abnormal when both the CRC codes do not match as a result of comparing both the CRCs. In this case, data is broken in a breaking part 56.

In the CPU 60, the CRC code created in the code inspecting part 61 is sent through the communication block 62. The sent CRC code is received by the CPU 50 through the communication block 52. This CRC code is compared with the CRC code created in the code inspecting part 51 in the comparing part 55 as described above.

Also, the CRC code created in the code inspecting part 61 of the CPU 60 is compared with the CRC code sent from the CPU 50 in a comparing part 65.

The comparing part 65 decides that it is abnormal when both the CRC codes do not match as a result of comparing both the CRCs. In this case, data is broken in a breaking part 66.

Then, in the CPU 50, the data received from the input part 81 is given to the set value processing part 53. However, in the case of deciding that it is abnormal as described above, delivery of data is inhibited in the breaking part 54 or the breaking part 56 and processing in the set value processing part 53 is stopped.

When data is inputted, data of a set destination and a set value are converted into a format used in the side of the field devices 1 in the set value processing part 53.

On the other hand, in the CPU 60, the data sent from the CPU 50 is given to the set value processing part 63. However, in the case of deciding that it is abnormal as described above, delivery of data is inhibited in the breaking part 64 or the breaking part 66 and processing in the set value processing part 63 is stopped.

When data is inputted, in the set value processing part 63, data of a set destination and a set value are converted into a format used in the side of the field devices 1 and the data of the set destination and the set value are outputted to an output part 82.

The data of the set destination and the set value outputted to the output part 82 are inputted to a comparing part 67 of the CPU 60 through a diagnostic circuit 83. Also, the data of the set destination and the set value outputted from the set value processing part 63 are directly inputted to the comparing part 67.

In the comparing part 67, the data of the set destination and the set value at a stage outputted from the set value processing part 63 are compared with the data of the set destination and the set value via the diagnostic circuit 83 and when a mismatch between both the data occurs, it is decided that it is abnormal. In this case, the data of the set destination and the set value are broken in a breaking part 68 and an output of the data of the set destination and the set value to the output part 82 is inhibited.

Also, the data of the set destination and the set value outputted from the CPU 60 to the output part 82 are inputted to a comparing part 57 of the CPU 50 through a diagnostic circuit 84. Further, the data of the set destination and the set value outputted from the set value processing part 53 are directly inputted to the comparing part 57.

In the comparing part 57, the data of the set destination and the set value outputted from the set value processing part 53 are compared with the data of the set destination and the set value outputted from the CPU 60 and when a mismatch between both the data occurs, it is decided that it is abnormal. In this case, the data of the set destination and the set value are broken in a fail-safe circuit 85 and an output of the data of the set destination and the set value from the CPU 60 to the output part 82 is inhibited.

Thus, in the fourth embodiment, the side of the CPU 60 executes a data output to the output part 82, but in the CPU 60, the outputted data is itself traced and in the case of deciding that it is abnormal, the data output is stopped. Also, in the CPU 50, the data outputted to the output part 82 by the CPU 60 is simultaneously traced and in the case of deciding that it is abnormal, an output by the CPU 60 from the side of the CPU 50 is inhibited. As a result of this, when either CPU decides that it is abnormal, the data output is inhibited, so that wrong data can surely be prevented from being outputted to the output part 82.

The scope of application of the invention is not limited to the embodiments described above. Also, the invention can be widely applied to an information processing system for handling various information as well as a safety system.

The present application is based on Japanese Patent Application (No. 2005-021423) filed on Jan. 28, 2005, the contents of which are incorporated herein by reference.

The invention claimed is:

1. An information processing apparatus comprising:
    a first device and a second device, each of which executes the same processing independently;
    a data collating part which collates first data generated by the first device with second data generated by the second device;
    a counting part which adds a count number to the first data;
    a count stop part which stops the counting part from adding the count number to the first data when both the first and second data are in disagreement with each other as a result of the collation by the data collating part; and
    a determining part which determines an abnormality exists based on the count number added by the counting part.

2. An information processing apparatus according to claim 1, further comprising:
    a processing stop part which stops a processing of the first device or a processing of the second device when an abnormality is determined to exist by the determining part.

3. An information processing apparatus according to claim 1, wherein the first device and the second device are separate semiconductor devices.

4. An information processing apparatus according to claim 1, wherein the first device and the second device are separate CPUs.

5. An information processing apparatus according to claim 1, wherein the first device and the second device are mounted insulated from each other.

6. An information processing method using a first device and a second device, each of which executes the same processing independently, the method comprising:
    (a) collating first data generated by the first device with second data generated by the second device;
    (b) adding a count number to the first data;
    (c) stopping adding the count number to the first data when both the first and second data are in disagreement each other in said step (a); and
    (d) determining an abnormality exists based on the added count number.

* * * * *